Patented Feb. 6, 1951

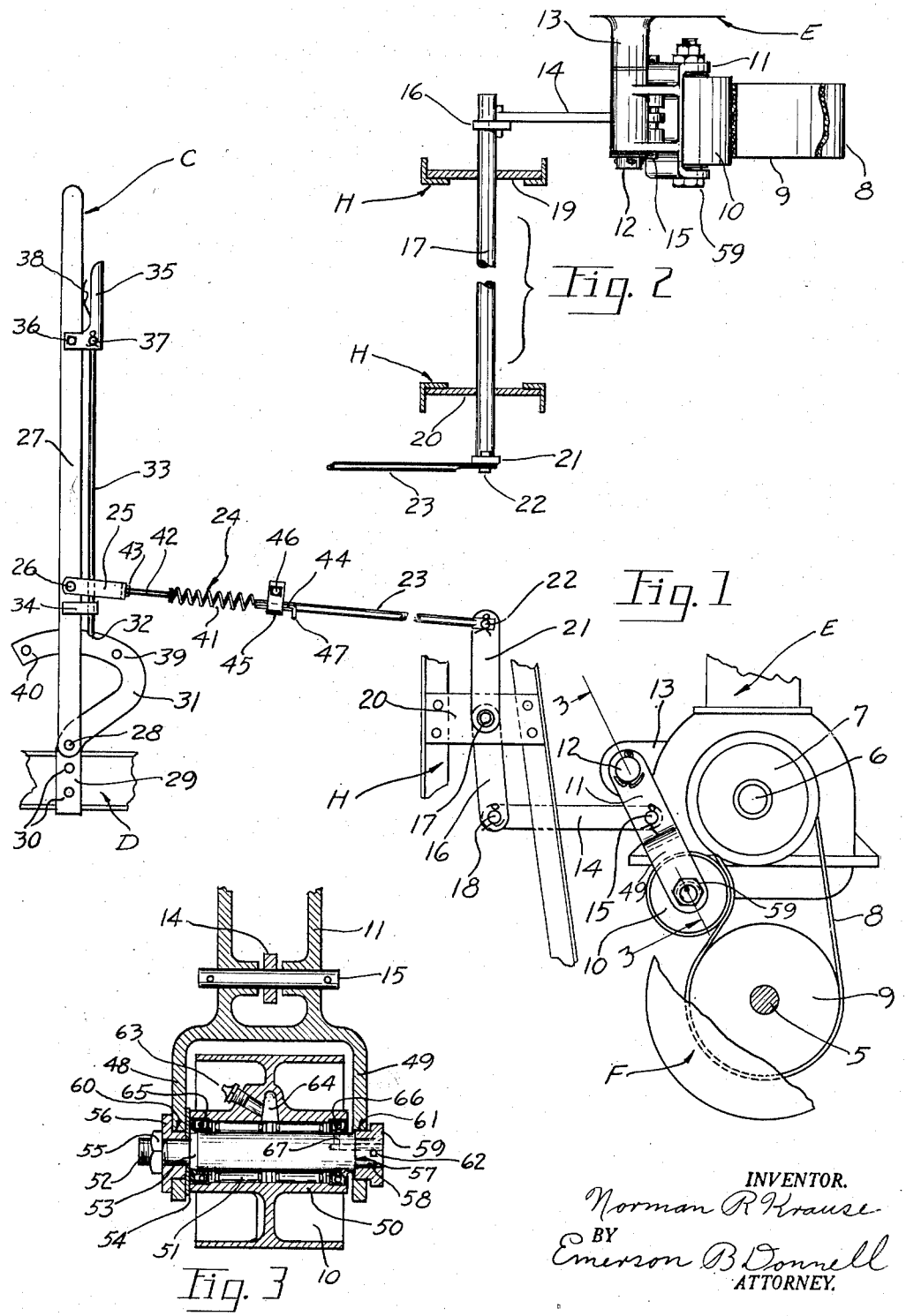

2,540,894

UNITED STATES PATENT OFFICE 2,540,894

POWER CONTROL

Norman R. Krause, Racine, Wis., assignor to J. I. Case Company, Racine, Wis., a corporation of Wisconsin Application February 26, 1945, Serial No. 579,858

6 Claims. (Cl. 74—242.1)

The present invention relates to a belt tightener and power control and an object thereof is to generally improve the construction and operation of devices of this class. In farm machinery, such as combination harvester threshers, for example, it is necessary that the mechanical expedients be as simple and inexpensive as possible, both because of the advantages of low first cost and the distance from a repair shop at which these devices are commonly used. The present device serves the purpose of satisfactorily maintaining a necessary tension in a simple belt drive. It also may act as a clutch or power stop control of very simple nature and which may be very readily repaired if necessary after long service. Belt drives are sometimes troublesome in that the belts will not run accurately on the pulleys but tend to run to one side or to run off.

Further objects of the invention accordingly are to provide a device which will tighten a belt repeatedly to a predetermined tension without careful attention on the part of the operator; which will compensate for wear or other deterioration through a generous range; which may be readily adjusted to restore a predetermined tension; which may assist in guiding a belt to run properly on its pulleys and which is suitably adjustable for this purpose.

The manner in which these objects are accomplished will be apparent from the following specification and accompanying drawings in which a suitable embodiment of the invention is shown. However, it is to be understood that the invention is not limited to the details disclosed but includes all such variations and modifications as fall within the spirit of the invention as herein expressed.

Figure 1 is a side elevation of a typical embodiment of the invention as applied to a harvester thresher.

Figure 2 is a plan view of the same.

Figure 3 is an axial sectional view taken substantially on the line 3—3 of Fig. 1.

As seen in Fig. 1, the device is applied to a combination harvester thresher, a portion of the frame of which is indicated generally as H, but it is to be understood that many of the principles of the invention are applicable to other machines, a harvester thresher being considered as typical. The machine has an engine generally designated as E, a fan F and a drawbar D. Fan F has a shaft 5 which in the present instance constitutes the main power input shaft of the machine and which is driven from engine E, the transmission of power between the two being governed by a control generally designated as C. Manipulation of control C can be used to start and stop shaft 5 at any time that engine E is running.

Engine E has a main output or crankshaft 6 carrying a pulley 7 preferably, although not necessarily, of the flanged type and which drives through a belt 8, a pulley 9 fixed on shaft 5. Pulley 7 being flanged, engine E may be run (driving pulley 7) with belt 8 loose enough to allow free rotation of pulley 7 without driving pulley 9. For driving pulley 9, belt 8 must be tightened and this is accomplished by an idler pulley 10 carried by an arm 11 pivoted on a fulcrum or pin 12 carried in the present instance by a boss or bracket 13, fixed with or forming a part of engine E. Swinging of arm 11 toward and from belt 8, will accordingly cause pulley 10 to tighten or loosen belt 8 as desired.

Such swinging of arm 11 is accomplished from above mentioned control C. For this purpose, arm 11 is connected by suitable means, such as a link 14 pivoted at 15 to arm 11, with an arm 16 in the present instance rigid with a rock shaft 17 (see also Fig. 2), a suitable pivot pin 18 connecting link 14 to arm 16.

Rock shaft 17 is carried in suitable bearings 19 and 20 on frame H and has an arm 21 pivoted at 22 to a rod 23 connected through a spring generally designated as 24 with a fitting 25 pivoted at 26 with a lever 27 constituting in the present instance above mentioned control C. Rocking lever C to the left, as seen in Fig. 1, will pull on rod 23, rock shaft 17 in a counterclockwise direction and, through link 14, press idler pulley 10 against belt 8. Reverse motion of lever 27 will loosen belt 8 and allow engine E to run free without driving shaft 5.

Lever 27 is fulcrumed at 28 to a bracket 29, bolted as at 30 or otherwise suitably fixed to drawbar D or any convenient part of the machine and swings adjacent a quadrant 31 forming in the present instance a part of bracket 29. Quadrant 31 is provided preferably with a single detent notch 32 which is engaged by any suitable detent mechanism as 33, slidable in a guide 34 and actuated by a hand grip portion 35 fulcrumed at 36 to lever 27. Detent 33 is pivoted at 37 to grip 35 and a spring 38 serves to continuously urge grip 35 away from lever 27 and accordingly to urge detent 33 into contact with quadrant 31. Thus, as will be apparent, when lever 27 is pulled to the left, detent 33 will drop into notch 32 and fix lever 27 in a definite predetermined position. This corresponds to the normal running position of pulley 10. Releasing of detent 33 by actuation of grip 35 permits lever 27 to move to the right and pulley 10 to move away from belt 8. A stop 39 is provided on quadrant 31 to limit this movement.

A stop 40 is also provided if desired, to limit travel of lever 27 to the left.

The tension in belt 8 should be controlled so as not to exceed a certain maximum and above mentioned spring 24 is provided to insure proper conditions being attained. In the present instance the device comprises a coil spring of common or well-known type 41 having an end extension 42 anchored in above mentioned fitting 25 in any suitable manner as by one or more lock nuts 43. The other end of spring 41 has an extension 44 which is maintained in rigid engagement with above mentioned rod 23 by means of a clamp 45 encircling rod 23 and extension 44. Clamp 45 is closed on members 23 and 44 by means of a bolt 46 and extension 44 has an upturned portion 47 which may engage the edge of clamp 45 to positively prevent withdrawal of extension 44. With bolt 46 loosened, the several parts may be fixed so that substantially exactly the right tension will result in belt 8 when detent 33 is engaged in notch 32. As will now be apparent, spring 41 will be somewhat extended under these conditions and will exert a continuous resilient pull on rod 23 so as to maintain the desired pressure of idler pulley 10 against belt 8. Slight changes in the length of belt 8, weaving of the machine frame, and such disturbances of the mechanism will be compensated by extending or collapsing of spring 41 so that the tension of belt 8 will be automatically maintained within the desired limits.

Belts such as 8, particularly when run with comparatively short centers, sometimes do not track properly on the pulleys and corrections in alignment are difficult to secure because the shafts are often connected to numerous other drives and shifting of the shafts is therefore not practical. In the present instance, an expedient has been devised for influencing the running of belt 8 and which is effective to correct the effect of any such minor misalignment or to correctly align pulley 10 in the event of any manufacturing variations in engine E or bracket 13, or other parts.

As best seen in Fig. 3, arm 11 is bifurcated and has portions 48 and 49 between which pulley 10 is disposed. Pulley 10 has a hub portion 50 journaled in the present instance on roller bearings 51 of suitable or well-known type on a pin 52 supported in portions 48 and 49. Pin 52 has a shoulder 53 which is urged against a washer 54 by a nut 55 engaging a bushing 56, washer 54 and bushing 56 being forced toward each other on opposite sides of portion 48, so as to clamp pin 52 rigidly in place in arm 11. At the other end, pin 52 has a shoulder 57 defining a reduced portion 58 engaged in a bushing 59 supported in above mentioned portion 49. In this manner, pin 52 is supported at its ends in arm 11. Bushings 56 and 59 are eccentric, that is to say the bushings have bores which are offset relatively to the center line of the outer diameters of the bushings. Bushing 56, for example, is engaged in a bore 60 in portion 48 but pin 52 is supported eccentrically relatively to bore 60. In similar manner, bushing 59 is engaged in a bore 61 and supports reduced portion 58 eccentrically of bore 61. Turning of bushings 56 and 59 within bores 60 and 61 will therefore cause displacement of the ends of pin 52 and change the relation of pulley 10 to arm 11. Thus if belt 8 has a tendency to run to one side, suitable shifting of bushing 56 or bushing 59, or both, can be resorted to, to change the angular relation of pulley 10 to belt 8 which will normally correct the running of the belt. Bushing 59 is maintained in place on portion 58 in any suitable manner as by a pin 62.

Lubrication for bearing 51 is supplied by means of a pressure fitting 63 of suitable or well-known type, a passageway 64 leading to bearing 51. Hub 50 is provided with grease retainers of suitable type 65 and 66. Since hub 50 is closed, sufficient grease pressure might inadvertently be built up to displace either or both of grease retainers 65 and 66. For this reason, a passageway 67 is provided, in the present instance in pin 52 and leading outwardly through portion 58. Excess grease forced in through fitting 63 will escape through passageway 67 without generating excessive pressure in hub 50. Also, grease issuing from passageway 67 will be an indication that bearing 51 is adequately lubricated.

From the above description, it will be apparent that devices and expedients have been provided for the accomplishment of the objects set forth, actuation of control C serving to tighten or loosen belt 8 and thereby to control the operation of driven shaft 5 at will. Furthermore, belt 8 will be invariably brought to the correct tension and compensation will be made for ordinary slight variations in dimensions of the parts. In the event that control C is inadvertently moved too far there will be no excessive stress introduced into belt 8 since spring 41 will merely stretch somewhat beyond its normal condition but without materially increasing the pressure on pulley 10. Alignment of arm 11 with pulley 7 is assured by the mounting of bracket 3 and pin 12 directly on engine E. Furthermore, since link 14 is connected with arm 11, in line with the middle of pulley 10, the pressure of the link has no tendency to twist arm 11 and the arm therefore remains in proper position relatively to belt 8. Furthermore, inaccurate running of the belt may be corrected by suitable adjustment of the bushings 56 and 59. The device is exceedingly simple and durable and easily repaired and it dispenses with the use of a highly organized clutch commonly necessary for control of power in similar installations.

The above being a complete description of an illustrative embodiment of the invention, what is claimed as new and desired to be secured by Letters Patent of the United States is:

1. In a power control the combination of a driving pulley and a driven pulley having substantially parallel axes, a belt tightener including a swinging arm having a pivot at one end thereof, a pin carried by said arm, an idler pulley journaled on the pin, and an eccentric bushing carried in the arm and supporting the pin whereby shifting of the bushing will change the angle of the pin and pulley relatively to the arm and axes of the drivings and driven pulleys for correcting the run of the belt in the event of inaccurate tracking thereof.

2. In a power control including a driving pulley and a driven pulley, said pulleys having axes substantially parallel to each other, a belt connecting said pulleys, an arm, a pin carried by the arm, an idler pulley journaled on the pin, said arm being swingable so as to shift said idler pulley toward and from the belt for tightening and loosening the same, means for so swinging the arm, and adjustable means connected between an end of the pin and the arm for shifting the pin relatively to the arm to change the angle of the pulley relatively to the belt and to the axes of the driving and driven pulleys for affecting the running of the belt to correct said running in the event of inaccurate tracking thereof.

3. In a linkage for controlling a belt tightener, the combination of a shiftable belt tightening idler pulley, a resilient deformable member connected to said shiftable belt tightening pulley in position to urge said pulley yieldingly in a belt tightening direction, and a control for said linkage connected with said resilient deformable member and adapted when moved in one direction to cause said resilient member to so move said idler pulley, and detent means constituted to maintain said control in a predetermined position wherein said resilient member is deformed a predetermined amount, said detent means being releasable for shifting of said control into a position wherein said resilient member is relieved from deformation, and said idler pulley is relieved from pressure in a belt tightening direction.

4. In a linkage for controlling a belt tightener, the combination of a shiftable belt tightening idler pulley, a resilient deformable member connected to said shiftable belt tightening pulley in position to urge said pulley yieldingly in a belt tightening direction, and a control for said linkage connected with said resilient deformable member and adapted when moved in one direction to cause said resilient member to so move said idler pulley, and detent means constituted to maintain said control in a predetermined position wherein said resilient member is deformed a predetermined amount, said detent means being releasable for shifting of said control into a position wherein said resilient member is relieved from deformation, and said idler pulley is relieved from pressure in a belt tightening direction, and said resilient member being adjustable to vary the pressure exerted on said pulley when said control is in said predetermined position.

5. In a power control the combination of a driving pulley and a driven pulley having substantially parallel axes, a belt tightener including a swinging arm having a pivotal support, a pin carried by said arm and spaced from said pivotal support, an idler pulley journaled in relation to said pin, and a supporting device interposed between an end of said pin and said swinging arm and adjustable relatively thereto to shift said end of said pin in relation to said arm for changing the angle of the pin and pulley relatively to the arm and axes of the driving and driven pulleys for correcting the running of the belt in the event of inaccurate tracking thereof.

6. In a power control the combination of a driving pulley and a driven pulley having substantially parallel axes, a belt tightener including a swinging arm having a pivotal support, a pin carried by said arm and spaced from said pivotal support, an idler pulley journaled in relation to said pin, and a supporting device interposed between an end of said pin and said swinging arm and adjustable relatively thereto in any direction to shift said end of said pin in relation to said arm for changing the angle of the pin and pulley relatively to the arm and axes of the driving and driven pulleys for correcting the running of the belt in the event of inaccurate tracking thereof.

NORMAN R. KRAUSE.

REFERENCES CITED

The following references are of record in the file of this patent:

UNITED STATES PATENTS

| Number | Name | Date |
|---|---|---|
| 229,841 | Rinehart et al. | July 13, 1880 |
| 256,913 | Mills | Apr. 25, 1882 |
| 258,242 | Merritt | May 23, 1882 |
| 420,476 | Thayer | Feb. 4, 1890 |
| 1,580,308 | Lawson | Apr. 13, 1926 |